United States Patent
Sacher et al.

(10) Patent No.: US 8,621,918 B2
(45) Date of Patent: Jan. 7, 2014

(54) TEST DEVICE COMPRISING A RECEIVING DEVICE FOR A VEHICLE MOCK-UP AND METHOD FOR TESTING A TEST VEHICLE USING A TEST DEVICE

(75) Inventors: Alois Sacher, Karisfeld (DE); Volker Sandner, Kaufering (DE)

(73) Assignee: ADAC E.V., Munich (DE)

( * ) Notice: Subject to any disclaimer, the term of this patent is extended or adjusted under 35 U.S.C. 154(b) by 25 days.

(21) Appl. No.: 13/469,185

(22) Filed: May 11, 2012

(65) Prior Publication Data

US 2012/0285229 A1    Nov. 15, 2012

(30) Foreign Application Priority Data

May 11, 2011   (DE) .......................... 10 2011 050 274
Jul. 8, 2011    (DE) .......................... 10 2011 051 704

(51) Int. Cl.
    *G01N 19/00*    (2006.01)
(52) U.S. Cl.
    USPC ........................................... 73/118.01
(58) Field of Classification Search
    USPC ........................................... 73/118.01
    See application file for complete search history.

(56) References Cited

U.S. PATENT DOCUMENTS

| 3,939,691 | A * | 2/1976 | Stanev et al. | 73/12.01 |
| 5,325,700 | A | 7/1994 | Litten | |
| 5,802,980 | A * | 9/1998 | Hofmiller | 105/72.2 |
| 6,932,173 | B2 * | 8/2005 | Henderson | 180/24.01 |
| 6,997,036 | B2 * | 2/2006 | Kojima et al. | 73/12.09 |
| 7,127,999 | B2 * | 10/2006 | Roane | 105/72.2 |
| 8,033,376 | B2 * | 10/2011 | Toews et al. | 198/300 |
| 2005/0178284 | A1 * | 8/2005 | Roane | 105/72.2 |

FOREIGN PATENT DOCUMENTS

| DE | 102008008665 | 9/2009 |
| DE | 102008022546 | 11/2009 |
| DE | 102011050274 | 5/2011 |
| DE | 102011051704 | 7/2011 |
| DE | 102010010153 | 9/2011 |
| JP | 20090128064 | 6/2009 |
| KR | 1020070024876 | 3/2007 |

OTHER PUBLICATIONS

European Search Report for serial No. EP2527813, filed May 11, 2011, mailed Oct. 31, 2012, 5 pgs.
German Examination Report for serial No.. DE102011051704, filed May 11, 2011, mailed Jan. 5, 2012, 5 pgs.

* cited by examiner

*Primary Examiner* — Freddie Kirkland, III
(74) *Attorney, Agent, or Firm* — Taylor English Duma LLP

(57) ABSTRACT

The invention relates to a test device for testing test vehicles, said test device having a receiving device for a vehicle mock-up. The receiving device for a vehicle mock-up is positioned on a rail system of the test device such that it can be moved.

15 Claims, 5 Drawing Sheets

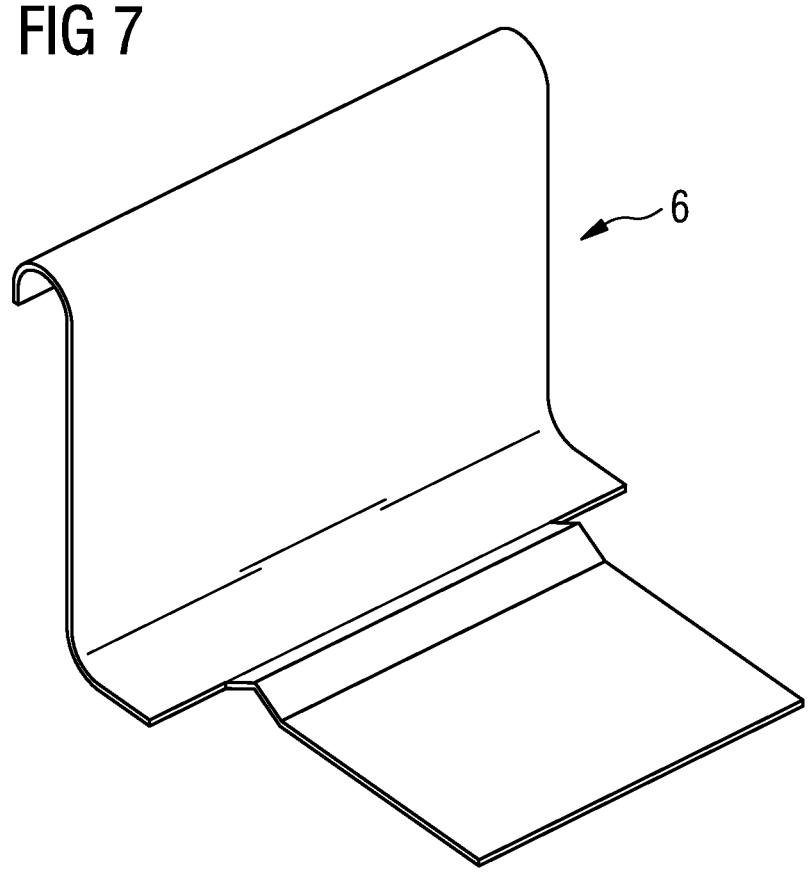

TEST DEVICE COMPRISING A RECEIVING DEVICE FOR A VEHICLE MOCK-UP AND METHOD FOR TESTING A TEST VEHICLE USING A TEST DEVICE

CROSS-REFERENCE TO RELATED APPLICATIONS

In accord with 35 U.S.C. §119, this application claims the benefit of German Patent Application serial number DE 10 2011 050 274.2, filed May 11, 2011, and German Patent Application serial number DE 10 2011 051 704.9, filed Jul. 8, 2011, which are hereby incorporated herein by reference in their entirety.

DESCRIPTION

The invention relates to a test device comprising a receiving device for a vehicle mock-up for test vehicles, in particular for test vehicles with assistance systems, and a method for testing a test vehicle using a test device.

To reduce the results of rear-end collisions or to prevent collisions entirely vehicles are provided with assistance systems, in particular predictive frontal protection systems (e.g. Adaptive Cruise Control (ACC), Advanced Emergency Braking Systems, AEBS). Using radar sensors, cameras and/or lasers these systems detect vehicles driving in front of them, warn the driver of the threat of a collision and/or trigger autonomous braking, thereby preventing the impact or reducing the speed of the impact.

Previously known test devices consist of a carrier vehicle in which the tail end of a vehicle mock-up can be swung out laterally during driving operation or, alternatively, of vehicle mock-ups on a trailer which are pulled by a tow vehicle using a cable. These systems can have disadvantages because it is impossible to record exactly the decrease in speed at the time of the impact unless the test device is designed for an impact with a residual speed. Furthermore, the lack of stability of the vehicle mock-up due to side winds or swaying movements of the vehicle mock-up due to side winds, in particular at low or high speeds, can be a problem. Moreover, there are test devices which can be used during acceleration or at constant speeds but not during deceleration. A further challenge lies in determining whether the vehicle mock-up or the carrier vehicle is the appropriate target for the assistance system of the test vehicle.

An object of the invention is to specify a test device for testing test vehicles, in particular test vehicles comprising assistance systems, that enables the collision forces after an impact by the test vehicle to be reduced. A further object of the invention is to specify a method for testing a test vehicle using a test device.

This is achieved by means of the subject matter of the independent claims. Advantageous developments of the invention are detailed in the dependent claims.

The invention provides for a test device for testing test vehicles, in particular test vehicles comprising assistance systems, the test device having a receiving device for a vehicle mock-up. In addition, the test device has a mobile rail system. The receiving device for a vehicle mock-up is positioned on the mobile rail system such that it can moved. The mobile rail system is supported on guide rollers. In addition, the receiving device for a vehicle mock-up comprises lateral guide rollers.

Both here and below a vehicle mock-up means a replica of a real vehicle, the vehicle mock-up having dimensions essentially the same as those of the real vehicle it is replicating. In particular, the vehicle mock-up can be a so-called balloon car, i.e. an inflatable vehicle mock-up, which may also have system-typical features of in particular a motor vehicle that may serve for sensors of predictive frontal protection systems, for example, to identify it as a vehicle, e.g. radar reflectors, tail lights, number plate, rear windscreen and/or shadows.

The test device disclosed in the invention has the advantage that following an impact between the test vehicle and the stationary or moving vehicle mock-up the vehicle mock-up can be pushed longitudinally over the rail system by the test vehicle, thereby reducing the collision forces significantly.

Thus the test device disclosed in the invention enables the vehicle mock-up to drive in a stable manner and in case of impact prevents the vehicle mock-up from skidding by prescribing a predetermined direction of movement.

In addition, in this arrangement the test device enables to drive over the tow device of the vehicle mock-up longitudinally and, due to the distance between the vehicle mock-up and the tow vehicle, makes for good differentiation between vehicle mock-up and tow vehicle, in particular for predictive frontal protection systems of the test vehicle.

As a stationary or longitudinally moving rail system, the test device with the rail-mounted vehicle mock-up disclosed in the invention thus advantageously enables the performance of assistance systems provided in the test vehicle to be tested without damaging the test vehicle.

The rail mounting means that the test device can also be used independently of environmental influences such as wind, rain or speed bumps, for example.

In a preferred embodiment the receiving device for a vehicle mock-up is provided in the manner of a slide.

The receiving device for a vehicle mock-up is placed on a movable rail system, i.e. the rail system is designed to be mobile or movable. Thereby, it is possible to simulate a vehicle which is stationary, accelerating, decelerating or moving at constant speed with the vehicle mock-up located on the preferably slide-like receiving device.

This advantageously enables the moving mock-up vehicle to simulate a driving vehicle in that a tow vehicle tows the rail system at the end of which is located the vehicle mock-up. The rail system can have a tow bar for this purpose. The tow vehicle can accelerate or decelerate the vehicle mock-up or move it at a constant speed. In this arrangement the test vehicle preferably follows the vehicle mock-up at a higher differential speed to provoke an impact.

In a further embodiment the receiving device for a vehicle mock-up has a vertically oriented additional frame. This enables the impact energy of the test vehicle to be absorbed, distributed superficially, converted into longitudinal movement and dissipated in the rail system and a spring system in a further improved manner.

In another embodiment of the invention the rail system is equipped with one or more spring systems. This advantageously enables the kinetic energy of the receiving device, being for example a slide with a carrier frame for a vehicle mock-up, to be conducted via the tow bar to the tow vehicle.

The length of the rail system can be adjusted by the provision of proximal and distal sections and a variable number of intermediate sections depending on the energy introduced into the receiving device when the test vehicle suffers an impact. In such an arrangement the proximal, distal and intermediate sections of the rail system are preferably joined together by a secured connection.

The rail system may comprise a proximal lattice girder section, a plurality of intermediate girder sections and a distal lattice girder section, wherein the height of the lattice girder structure above a road is less than 70 mm.

The invention thus specifies a test device which allows the use of a vehicle mock-up universally calibrated to all manufacturer-specific sensor systems that uses a vehicle mock-up of low weight, guarantees stable driving operation of the vehicle mock-up, prevents the vehicle mock-up from skidding in the event of an impact by prescribing a predetermined direction of movement and allows to drive over the tow device of the vehicle mock-up longitudinally. In such an arrangement the mass of the vehicle mock-up can be reduced to such an extent that following an impact by the test vehicle the collision forces can be significantly reduced without limiting the stability of the vehicle mock-up.

The test device disclosed in the invention can be used for all relevant driving scenarios, i.e. stationary, accelerating, driving at a constant speed or decelerating, in longitudinal traffic. Due to its rail mounting the test device can advantageously be used independently of environmental influences and due to the distance between the vehicle mock-up and the tow vehicle allows good differentiation between the vehicle mock-up and carrier/tow vehicle in particular for predictive frontal protection systems in the test vehicle.

Thus the invention specifies a test device with a rail-mounted vehicle mock-up which, being a stationary or longitudinally moving rail system, allows the performance of assistance systems provided in the test vehicle to be tested without damaging the test vehicle.

The invention also relates to an assembly comprising a tow vehicle, a vehicle mock-up and a test device in accordance with one of the previous embodiments.

In an embodiment, the vehicle mock-up is provided as a balloon car.

The invention further relates to a method for testing a test vehicle using a tow vehicle, a vehicle mock-up and a test device in accordance with one of the previous embodiments, said method comprising the steps of
- arranging the test device behind the tow vehicle and the test vehicle behind the test device on a common lane;
- connecting the test device and the tow vehicle with one another;
- positioning the receiving device for a vehicle mock-up and the vehicle mock-up in a starting position on the mobile rail system of the test device;
- accelerating the tow vehicle in a first direction on the common lane to a first speed $v_1$;
- accelerating the test vehicle in the first direction on the common lane to a second speed $v_2$;
- testing at least one component of the test vehicle at least partially during accelerating the tow vehicle to the first speed $v_1$ and accelerating the test vehicle to the second speed $v_2$.

Testing at least one component of the test vehicle may include testing an assistance system of the test vehicle, in particular a predictive frontal protection system of the test vehicle.

The starting position is preferably at a distal end of the test device, distal to the tow vehicle.

In a further embodiment, from the point of view of the test vehicle, the tow vehicle and the rail system of the test device are essentially hidden by the vehicle mock-up arranged at the distal end of the test device.

In another embodiment the second speed $v_2$ is greater than the first speed $v_1$, i.e. $v_2 > v_1$. In this embodiment the test vehicle follows the vehicle mock-up at a higher differential speed to provoke an impact.

After a collision of the test vehicle with the vehicle mock-up, the test vehicle may drive over the rail system of the test device longitudinally.

The invention is explained in greater detail below with reference to the attached drawings.

FIG. 7 illustrates an aluminium plate for fixing the vehicle mock-up.

FIG. 1A illustrates a schematic representation of an embodiment of a test device 1 as disclosed in the invention comprising a receiving device for a vehicle mock-up of low mass in particular for testing predictive frontal protection systems in a test vehicle 21 during driving operation.

Figure 1A:
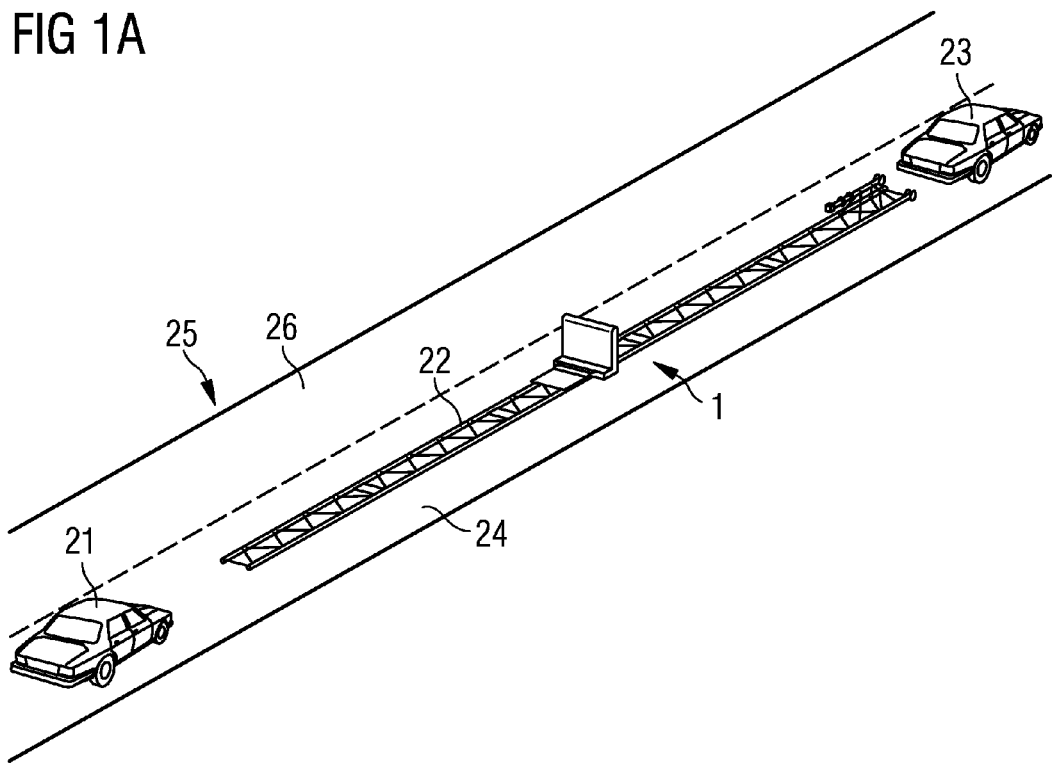
FIG. 1A illustrates a schematic representation of an embodiment of a test device as disclosed in the invention comprising a receiving device for a vehicle mock-up.

In the illustrated embodiment the test device 1 comprising a receiving device for a vehicle mock-up of low mass for testing predictive frontal protection systems in the test vehicle 21 has a rail system 22 supported on guide rollers which is pulled by a tow vehicle 23. FIG. 1A illustrates the test device 1 and the tow vehicle 23 prior to a connection of the test device 1 and the tow vehicle 23 with one another.

As illustrated in FIG. 1A, the test vehicle 21, the tow vehicle 23, and the test device 1 comprising the receiving device for a vehicle mock-up are arranged on a common lane 24 of a road 25. The test device 1 is arranged behind the tow vehicle 23 and the test vehicle 21 is arranged behind the test device 1 on the lane 24. The road 25 has a further lane 26 arranged adjacent the lane 24. During the testing, the test vehicle 21, the tow vehicle 23, and the test device 1 move in a common direction on the lane 24 which is a direction being essentially parallel to the longitudinal axis of the tow vehicle 23.

Figure 1B:
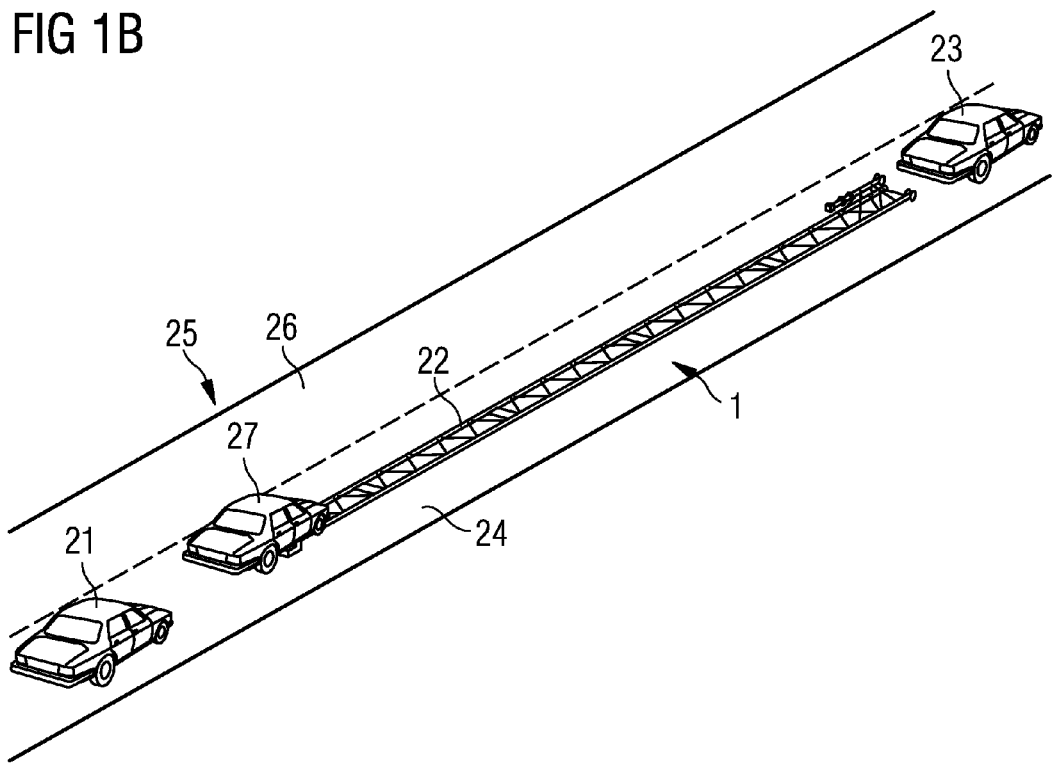
FIG. 1B illustrates a schematic representation of an embodiment of a test device as disclosed in the invention comprising a receiving device for a vehicle mock-up.

FIG. 1B illustrates a schematic representation of an embodiment of a test device 1 as disclosed in the invention comprising a receiving device for a vehicle mock-up 27 of low mass. Components with the same functions as in FIG. 1A are designated with the same reference numerals and are not explained again in detail.

The vehicle mock-up 27 may be a balloon car, i.e. an inflatable vehicle mock-up. As illustrated in FIG. 1B, the vehicle mock-up 27 and the receiving device for the vehicle mock-up 27 are arranged at a distal end of the test device 1, distal to the tow vehicle 23 when a test for the test vehicle 21, in particular a test for testing predictive frontal protection systems of the test vehicle 21, is carried out and prior to an impact of the test vehicle 21. The test vehicle 21 typically follows the vehicle mock-up 27 at a higher differential speed to provoke an impact, i.e. the speed of the test vehicle 21 is greater than the speed of the tow vehicle 23.

From the point of view of the test vehicle 21, the tow vehicle 23 and the rail system 22 of the test device 1 being arranged at ground level, i.e. near the surface of the road 25, are essentially hidden by the vehicle mock-up 27 arranged at the distal end of the test device 1 prior to an impact of the test vehicle 21. Thereby a good differentiation between the vehicle mock-up 27 and the tow vehicle 23 is achieved, in particular for predictive frontal protection systems in the test vehicle 21, i.e. the vehicle mock-up 27 is identified as the appropriate target for assistance systems of the test vehicle 21. After a collision of the test vehicle 21 with the vehicle mock-up 27, the test vehicle 21 may drive over the rail system 22 of the test device 1 longitudinally.

Figure 2:
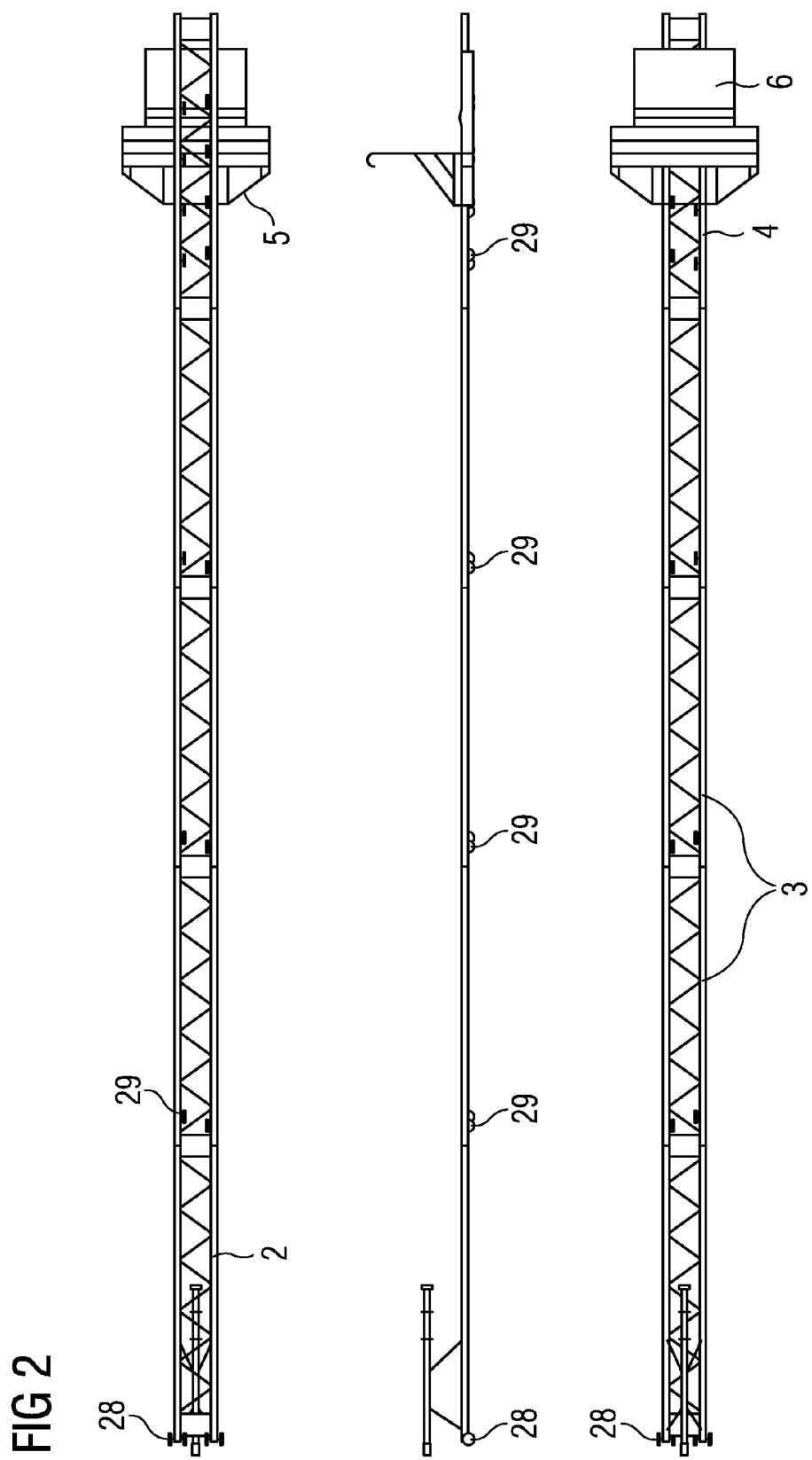
FIG. 2 illustrates a schematic representation of an embodiment of a test device as disclosed in the invention comprising a receiving device for a vehicle mock-up.

As shown in FIG. 2, the rail system 22 comprises a proximal lattice girder section 2 proximal to the tow vehicle, a plurality of intermediate girder sections 3 and a distal lattice girder section 4 distal to the tow vehicle on which are placed a receiving device in the form of a slide 5 for receiving a vehicle mock-up of low mass and an aluminium plate 6 for fixing the vehicle mock-up. In the embodiment shown the individual sections, i.e. the proximal lattice girder section 2, the intermediate girder sections 3 and the distal lattice girder section 4, are connected together by a screw-fixed plug-in connection.

As illustrated in FIG. 2, the proximal lattice girder section 2 comprises large guide rollers 28 contacting the road and the intermediate girder sections 3 and the distal lattice girder section 4 each comprise small guide rollers 29 contacting the road.

Figure 3:
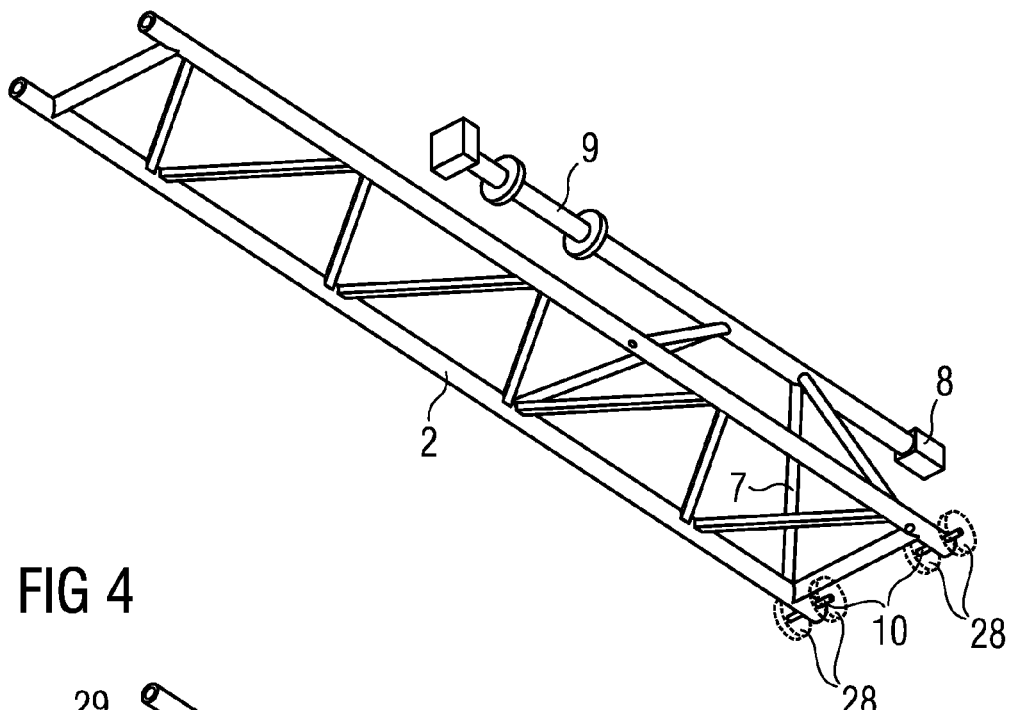
FIG. 3 illustrates a representation of a first rail structure comprising a proximal lattice girder section designed as a standard lattice girder with further attachments.

As shown in FIG. 3, in the illustrated embodiment the proximal lattice girder section 2 consists of a standard lattice girder and a welded additional frame 7 on top of which is located a tow bar 8 for a tow vehicle and opposite it on the same level as the tow bar 8 a spring system 9 to damp the kinetic energy of the slide 5 for receiving a vehicle mock-up of low mass in the spring and conduct it via the tow bar 8 to the tow vehicle. A receiving system 10 for the large guide rollers 28 underneath a trailer coupling protects the test device 1 in case of the bottoming out of the tow vehicle and the associated ground contact of the test device 1. Further receiving systems for small guide rollers can be added on the inside of the standard lattice girder. The preferred length for the proximal lattice girder section 2 is 3,200 mm; the preferred height for the trailer coupling is 430 to 530 mm.

Figure 4:
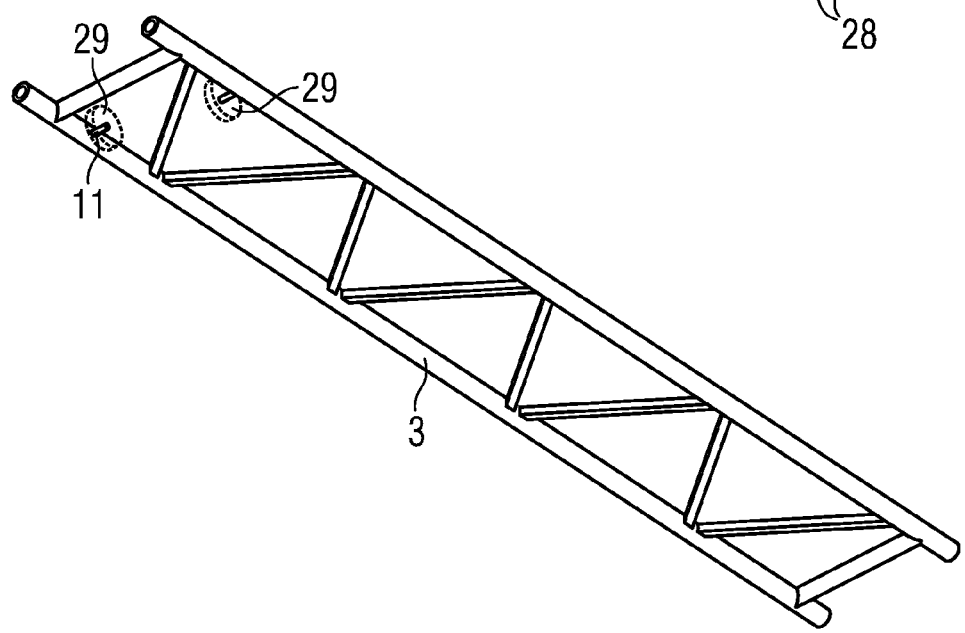
FIG. 4 illustrates a representation of a second rail structure comprising an intermediate girder section designed as a standard lattice girder with further attachments.

As shown in FIG. 4, in the illustrated embodiment the intermediate girder section 3 consists of a standard lattice girder with a receiving system 11 for the small guide rollers 29 which is mounted on the inside, the number of the small guide rollers 29 being variable dependent on the nature of the ground surface so far as at least two receiving systems per intermediate girder section 3 are provided. The preferred length of the intermediate girder section 3 is 3,000 mm; the preferred height of the lattice girder structure from the road is less than 70 mm. The number of intermediate girder sections 3 varies depending on the differential speed at the time of the impact.

Figure 5:
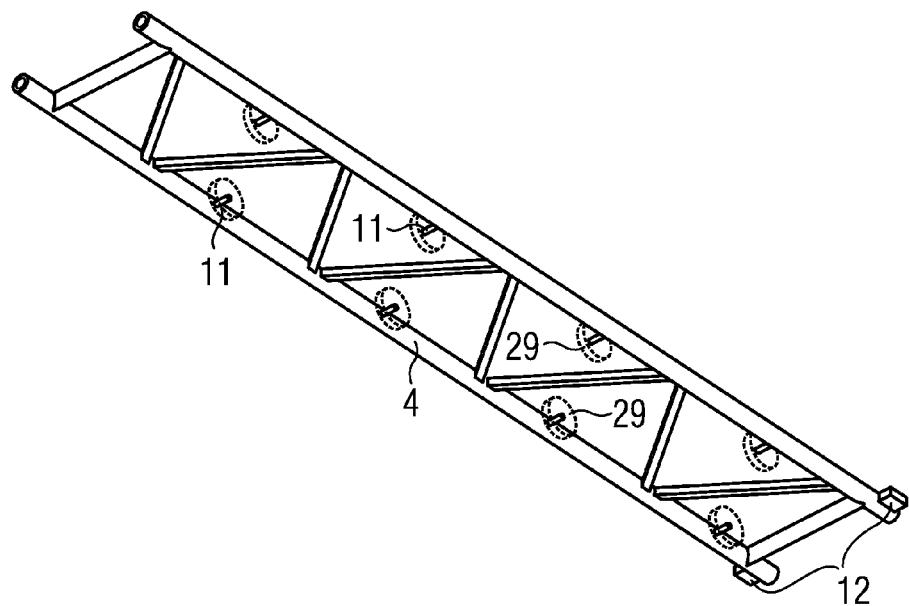
FIG. 5 illustrates a representation of a third rail structure comprising a distal lattice girder section designed as a standard lattice girder with further attachments.

As illustrated in FIG. 5, in the embodiment shown the distal lattice girder section 4 consists of a standard lattice girder, two spring systems 12 to secure the slide 5 for receiving a vehicle mock-up against sliding off the rail structure and preferably at least six receiving systems 11 for the small guide rollers 29 mounted on the inside as for the majority of test operation the slide 5 for receiving a vehicle mock-up is located in the distal lattice girder section 4 and experiences the highest load in the event of an impact. The preferred length of the distal lattice girder section 4 is 3,000 mm; the preferred height of the lattice girder structure above the road is less than 70 mm.

Figure 6:
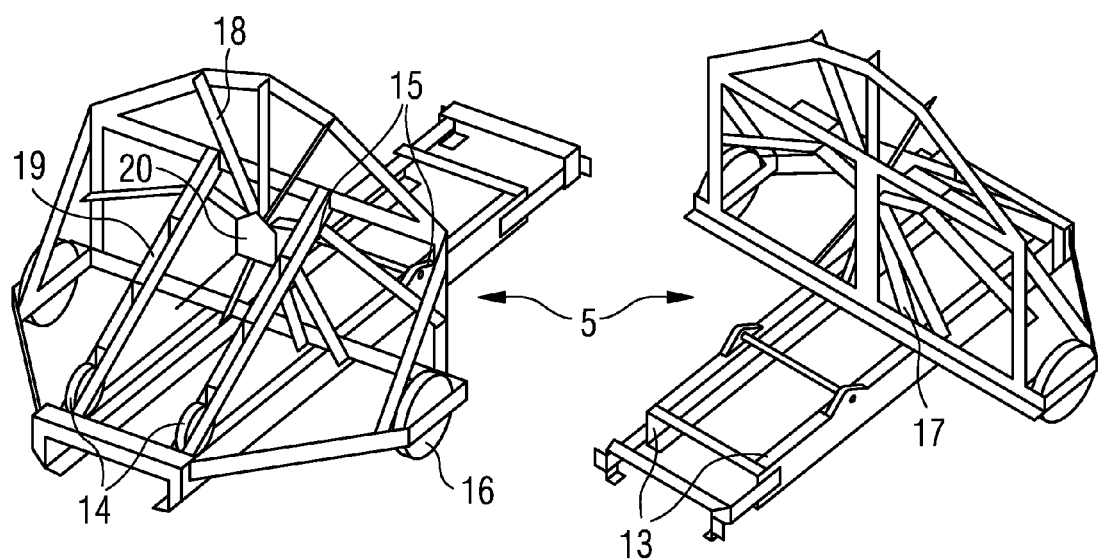
FIG. 6 illustrates a receiving device for a vehicle mock-up of low mass, the receiving device being designed as a slide.

FIG. 6 shows a receiving device for a vehicle mock-up of low mass designed as a slide 5.

The slide 5 is provided as a carrier frame for a vehicle mock-up. The vehicle mock-up, which is not illustrated in greater detail, typically consists of the shell of a so-called balloon car, fixings and system-typical features of a motor vehicle (e.g. radar reflectors, tail lights, number plate, rear window, shadows) which can be identified as a vehicle by sensors in the predictive frontal protection systems provided in the test vehicle. The slide 5 for receiving a vehicle mock-up of low mass is held in position on the rail by two U-sections 13 and four guide rollers 14, 15 in two sizes. In this arrangement the first guide rollers 14 are of a first size and the second guide rollers 15 of a second size. Two large rollers in the form of lateral guide rollers 16 on the sides of the slide 5 provide lateral guidance and prevent tipping. When the test vehicle impacts the slide 5 for receiving a vehicle mock-up of low mass due to the differential speed, the slide 5 with the four guide rollers 14, 15 runs along the rail, the U-sections 13 providing lateral guidance and preventing it from jumping off vertically.

In the embodiment shown the slide 5 also has a vertically oriented additional frame 17 consisting of struts 18 configured in a star shape which are connected to one another in an arc to distribute force evenly in the event of an impact. This structure is supported at the front by two diagonally running struts 19 so that the tilting torque is absorbed by the guide rollers 14. Fitted in the centre of the additional frame 17 is an impact plate 20 to introduce the force into the spring system 9 of the proximal lattice girder section 2 when the slide 5 is impacted.

An aluminium plate 6 illustrated in FIG. 7 serves to fix the vehicle mock-up, to protect it against damage and to distribute the impact energy evenly over the struts 18 which are configured in a star shape as shown in FIG. 6.

The structural principle of test device 1 with a receiving device for a vehicle mock-up for testing for example predictive frontal protection systems as described is particularly well suited to design and test drives on straight routes with pre-impact differential speeds of up to 50 km/h at a tow vehicle nominal speed of 80 km/h and a total length of at least 9,200 mm.

LIST OF REFERENCE NUMERALS

1 Test device
2 Proximal lattice girder section
3 Intermediate girder section
4 Distal lattice girder section
5 Slide
6 Aluminium plate
7 Additional frame
8 Tow bar
9 Spring system
10 Receiving system (for large guide rollers)
11 Receiving system (for small guide rollers)
12 Spring system
13 U-section
14 Guide roller
15 Guide roller
16 Lateral guide roller
17 Additional frame
18 Strut
19 Strut
20 Impact plate
21 Test vehicle
22 Rail system
23 Tow vehicle
24 Lane 25 Road
26 Lane
27 Vehicle mock-up
28 Guide roller
29 Guide roller

We claim:

1. Test device for testing test vehicles, the test device comprising a receiving device for a vehicle mock-up, wherein the receiving device for a vehicle mock-up is positioned on a mobile rail system of the test device such that it can be moved, wherein the mobile rail system is supported on guide rollers and wherein the receiving device for a vehicle mock-up comprises lateral guide rollers.

2. Test device in accordance with claim 1, characterised in that the receiving device for a vehicle mock-up is provided in the manner of a slide.

3. Test device in accordance with claim 1, characterised in that the receiving device for a vehicle mock-up comprises a vertically oriented additional frame.

4. Test device in accordance with claim 1, characterised in that the rail system comprises a tow bar.

5. Test device in accordance with claim 1, characterised in that the rail system further comprises at least one spring system.

6. Test device in accordance with claim 1, characterised in that the length of the rail system is set by proximal and distal sections and a variable number of intermediate sections depending on the energy introduced into the receiving device.

7. Test device in accordance with claim 6, characterised in that the proximal, distal and intermediate sections of the rail system are joined together by a secured connection.

8. Test device in accordance with claim 6, characterised in that the rail system comprises a proximal lattice girder section, a plurality of intermediate girder sections and a distal lattice girder section, wherein the height of the lattice girder structure above a road is less than 70 mm.

9. Assembly comprising a tow vehicle, a vehicle mock-up and a test device in accordance with claim 1.

10. Assembly in accordance with claim 9, wherein the vehicle mock-up is provided as a balloon car.

11. Method for testing a test vehicle using a tow vehicle, a vehicle mock-up and a test device in accordance with claim 1, said method comprising:
    arranging the test device behind the tow vehicle and the test vehicle behind the test device on a common lane;
    connecting the test device and the tow vehicle with one another;
    positioning the receiving device for a vehicle mock-up and the vehicle mock-up in a starting position on the mobile rail system of the test device;
    accelerating the tow vehicle in a first direction on the common lane to a first speed $v_1$;
    accelerating the test vehicle in the first direction on the common lane to a second speed $v_2$;
    testing at least one component of the test vehicle at least during accelerating the tow vehicle to the first speed $v_1$ and accelerating the test vehicle to the second speed $v_2$.

12. Method in accordance with claim 11, characterised in that the starting position is at a distal end of the test device, distal to the tow vehicle.

13. Method in accordance with claim 12, characterised in that, from the point of view of the test vehicle, the tow vehicle and the rail system of the test device are essentially hidden by the vehicle mock-up arranged at the distal end of the test device.

14. Method in accordance with claim 11, characterised in that $v_2 > v_1$.

15. Method in accordance with claim 11, characterised in that after a collision of the test vehicle with the vehicle mock-up, the test vehicle drives over the rail system of the test device longitudinally.

* * * * *